May 10, 1966 F. G. SCHMIDT ETAL 3,250,307
COLLAPSIBLE PORTABLE SAW WITH MEANS FOR TRANSPORTING THE SAME
Filed Oct. 19, 1962 4 Sheets-Sheet 4
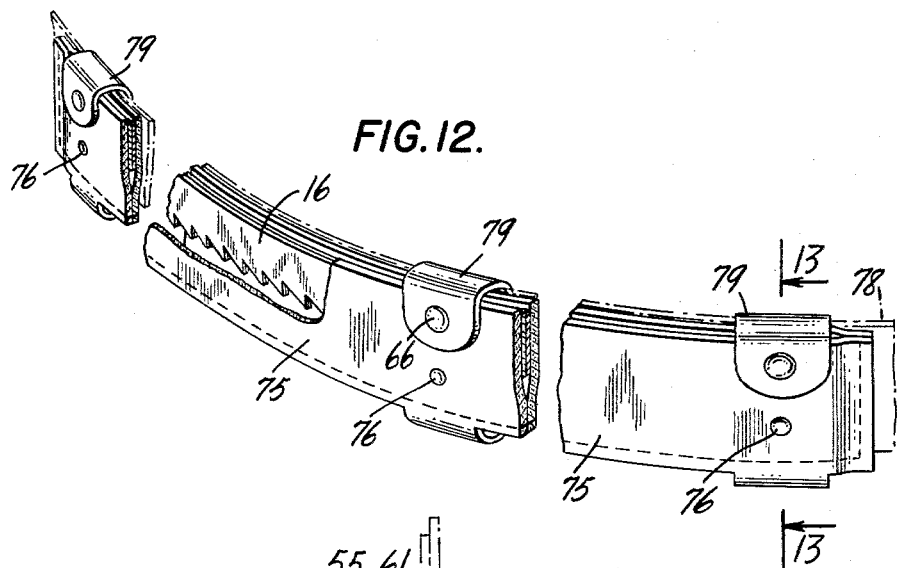
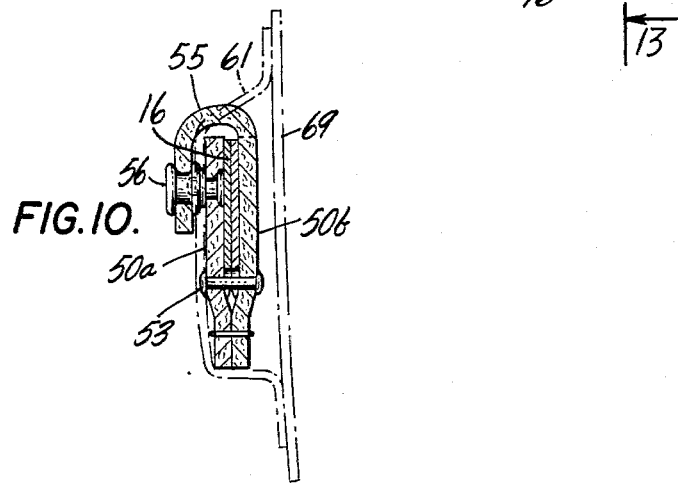
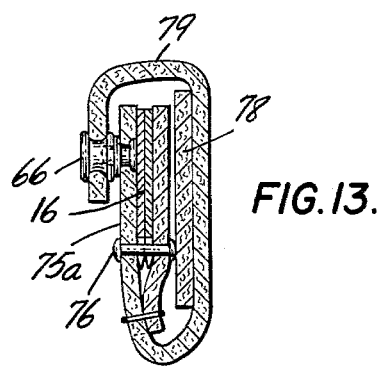

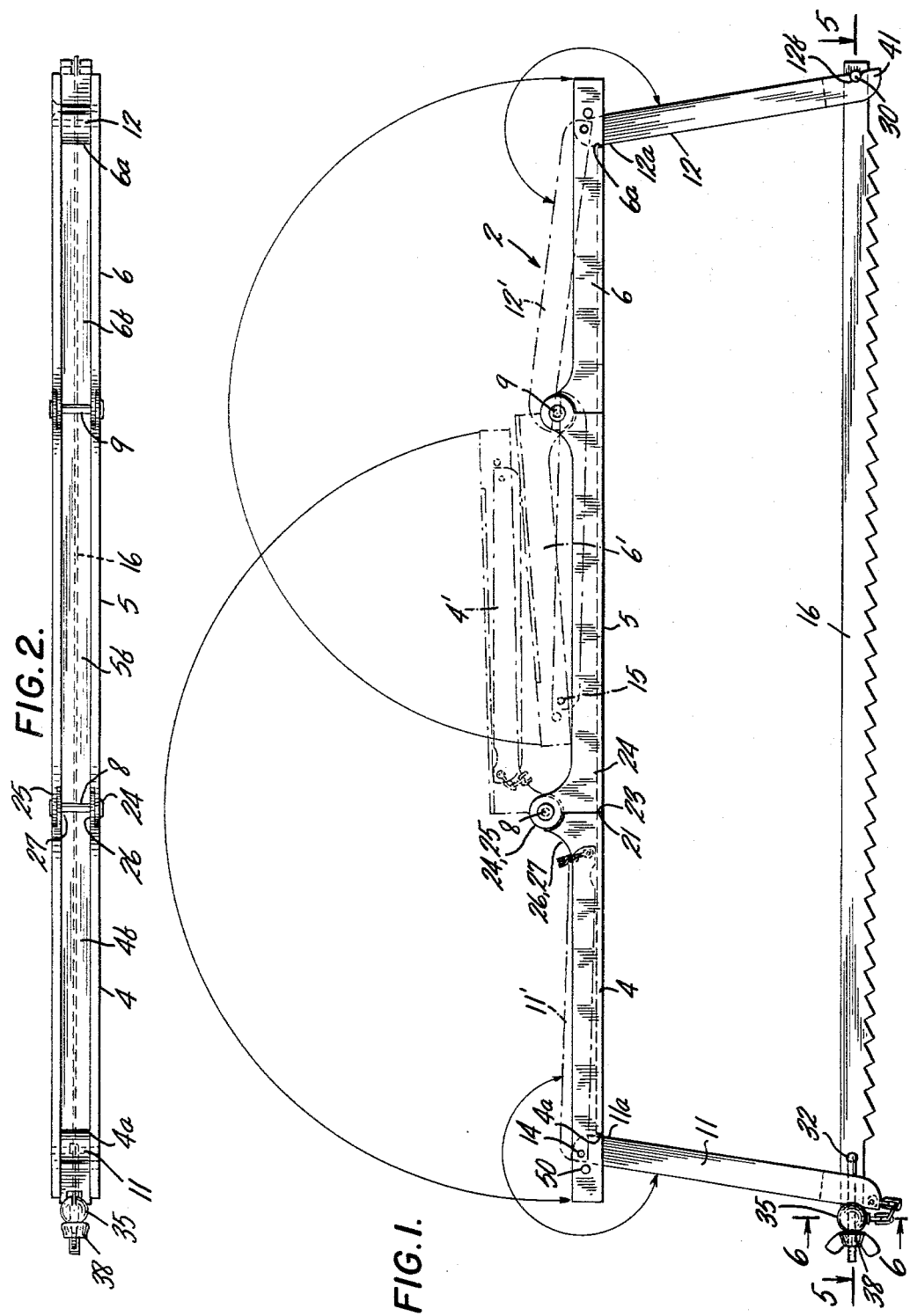

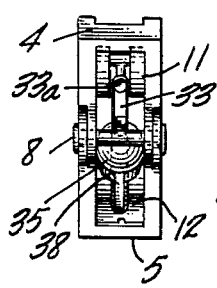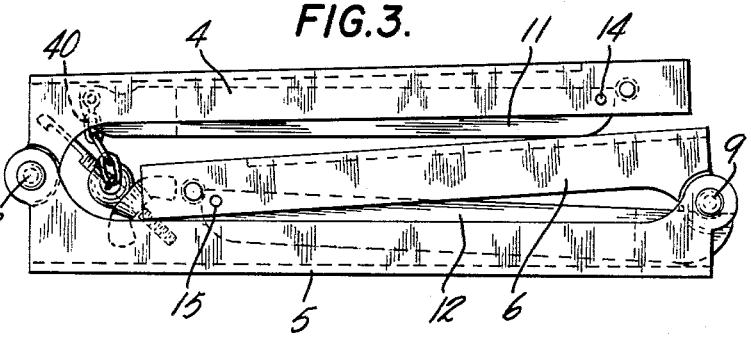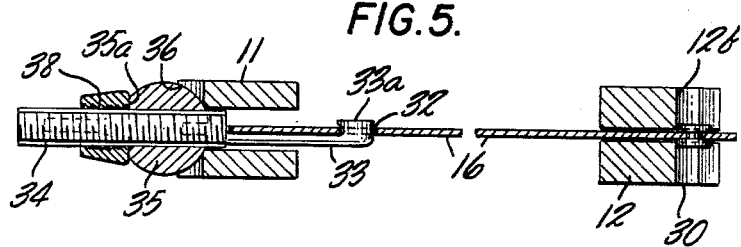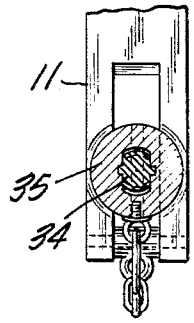

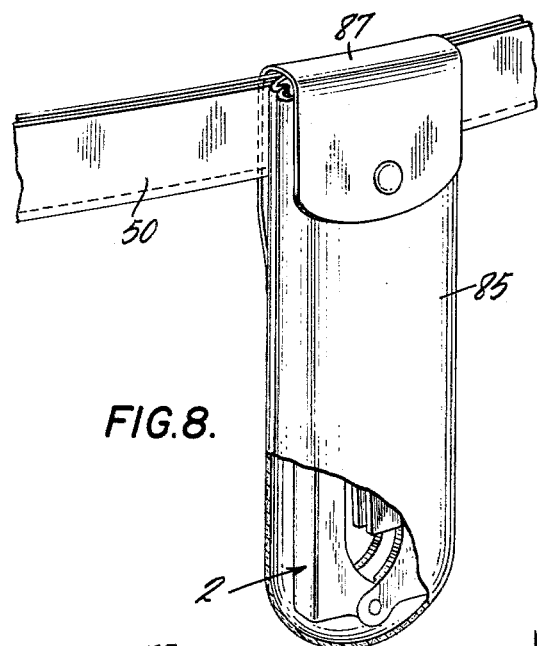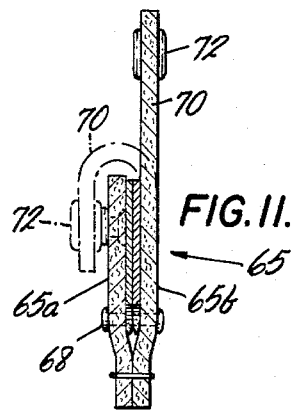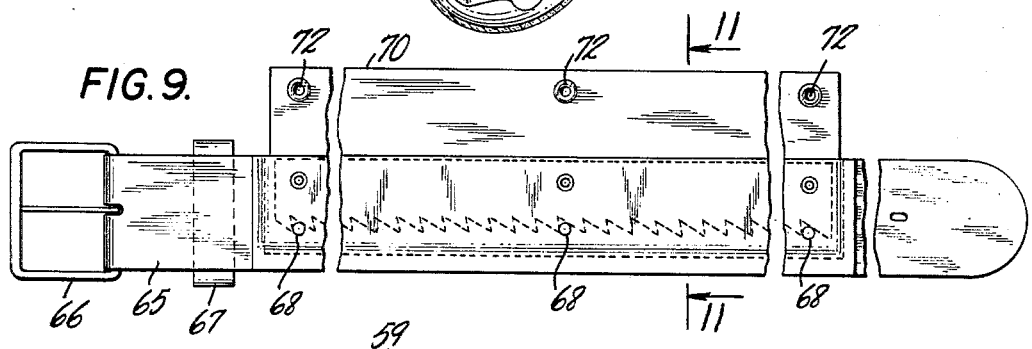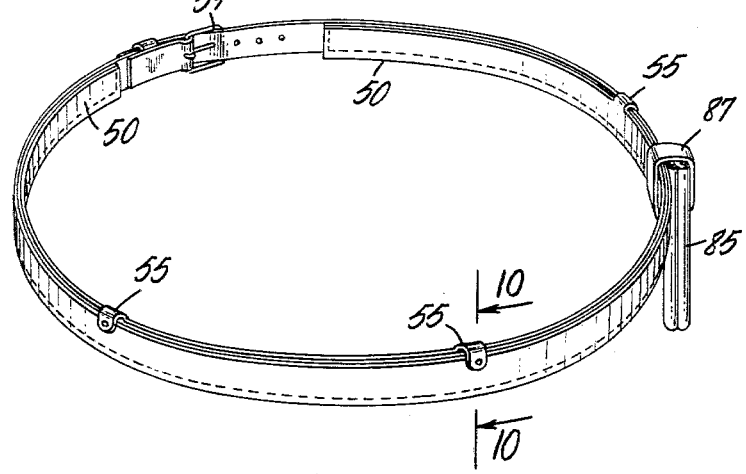

United States Patent Office 3,250,307
Patented May 10, 1966

3,250,307
COLLAPSIBLE PORTABLE SAW WITH MEANS FOR TRANSPORTING THE SAME
Frank G. Schmidt, Skyview Drive, Armonk, N.Y., and Robert J. Kearney, 12 Avondale Road, Crestwood, N.Y.
Filed Oct. 19, 1962, Ser. No. 231,868
6 Claims. (Cl. 145—33)

This invention relates generally to saws and more particularly to a collapsible hand saw.

Collapsible hand saws usable by campers, fishermen and woodsmen in general are known. These known collapsible hand saws are usually of the bucksaw type and comprise a plurality of rigid members which can be moved to positions forming a rigid saw frame and collapsed when not in use. The saw frame members are usually articulated or are capable of telescoping. The saw blade used with this type of saw is generally either transported separately from the collapsible frame or in some constructions is sheathed within the saw frame members while in a collapsed condition.

In all of the known constructions the saw frame in a collapsed condition must be hand carried. The type of saws known that are collapsible are generally articulated in such a manner that even in a collapsed condition the entire assembly is relatively cumbersome to carry and handle while in the field.

It is a principal object of the present invention to provide a collapsible saw that can be transported readily leaving the hands of the person carrying it when not in use completely free to carry out other operations and having the saw in readiness for substantially instant use.

A feature of the collapsible saw according to the invention, is the combination of a collapsible saw frame comprising a plurality of articulated members which are selectively movable into locked positions in which the members form a rigid assembly and can be moved to a collapsed condition. The adjoining articulated members of the saw frame comprise surfaces that coact automatically to hold the members in rigid assembly when the members are extended from their collapsed positions. A flexible saw blade removable from the frame after use is provided. The saw frame members comprise members for holding the saw blade in an extended condition for cutting therewith when the saw frame assembly is in a rigid condition. An elongated sheath is provided which is wearable as an article of apparel for receiving and releasably holding the blade when not in use. A case which is attached, or may be attached in use, to the elongated sheath is provided for receiving and releasably holding therein the saw frame in a collapsed condition.

Other features and advantages of the combination in accordance with the present invention will be better understood as described in the following specification and appended claims, in conjunction with the following drawings, in which:

FIG. 1 is a side elevation view of a collapsible saw according to the invention and illustrates the saw in a completely assembled condition and the saw frame thereof in a collapsed condition in phantom;

FIG. 2 is a plan view of the saw in FIG. 1;

FIG. 3 is a side elevation view illustrating the saw of FIG. 1 in a collapsed condition;

FIG. 4 is an end view of the saw illustrated in FIG. 3 as viewed from the left hand end thereof;

FIG. 5 is a sectional view taken along section line 5—5 of FIG. 1;

FIG. 6 is a sectional view taken along section line 6—6 of FIG. 1;

FIG. 7 is a perspective view of a belt sheath for a blade of the saw according to the invention;

FIG. 8 is a perspective view of a case for receiving the frame of the saw of FIG. 3 in a collapsed condition and has a portion of the case cutaway to illustrate the saw frame in position therein;

FIG. 9 is a fragmentary side elevation view of a second embodiment of a sheath for the saw blade of the combination of the invention;

FIG. 10 is a section view taken along section line 10—10 of FIG. 7;

FIG. 11 is a section view taken along section line 11—11 of FIG. 9;

FIG. 12 is a fragmentary view of an enlarged scale of another embodiment of a saw blade sheath; and FIG. 13 is a section view taken along section line 13—13 of FIG. 12.

The collapsible saw 1, according to the invention, as illustrated in FIGS. 1–6 comprises a saw frame 2. The frame 2 comprises a plurality of articulated members that can be positioned relative to each other to form in extended condition a rigid saw frame assembly and are pivotally secured for movement relative to each other so that they can be selectively moved into a collapsed condition or the rigid extended assembly. The saw frame comprises three rigid articulated members 4, 5 and 6. These three members form the back of the saw when in an aligned extended condition as illustrated in FIG. 1. The three members are pivotally secured at pivots 8, 9. Adjacent the opposite, bifurcated, outer ends of the outermost back members 4, 6 are disposed a pair of pivotally mounted members forming arms or legs 11, 12 pivotally secured at pivots 14, 15 respectively on the outermost members 4 and 6 as illustrated.

The two outermost members 4 and 6 have bifurcated free ends so that the two arms 11, 12, when positioned in a depending position illustrated in FIG. 1 hold therebetween a bendable saw blade 16 secured thereto and held in an extended condition for sawing therewith. The blade 16 can be removed from the arms as hereafter described and the arms 11, 12 are movable to the positions 11', 12' illustrated in phantom in FIG. 1. It will be understood that the back members are each constructed in the form of channels.

The back members are constructed so that surfaces of contiguous ends thereof abut when in an extended and aligned positions condition as illustrated in FIG. 1. For example, the opposing ends 21, 23 of the two contiguous back members 4, 5 abut. This is accomplished by constructing the central or intermediate back member 5 with offset portions 24, 25 on opposite sides thereof into which extend registering projections 26, 27 of the outermost member 4. The pivot 8 extends through all of the registering projections forming a pivotal connection between the two contiguous members. It will be understood that the members 5 and 6 cooperate in a similar manner. The abutting surfaces heretofore described are positioned so that the back members are restrained from movement when the saw is assembled as illustrated in FIG. 1.

The arms 11, 12 have their edge surfaces 11a, 12a respectively abutting end surfaces 4a, 6a of the outer back members so that they are constrained from rotational movement toward each other when in their extended position of FIG. 1. The back members are made with portions 4b, 5b, 6b thereof defining the bottoms of the channels found therein sufficiently thick so that the abutting surfaces hold the members in locked or restrained in position to keep them from movement and to provide for movement only toward a collapsed condition as hereafter explained at length.

The saw frame is collapsed by removing the saw blade therefrom and pivoting the arms 11, 12 to the positions illustrated in phantom as before described. The arm 12 is provided with a recess 12b so that when moved to its position 12' the recess rests on the pivot 9 and engages it as illustrated. When the arm 12 is rested on the pivot 9 it is partially housed in the channels formed in member 6. Then the two members jointly are pivoted on pivot 9 to the position in which the arm 6 is denoted 6' and member 12 is partially housed in the channel of the central member 5. The opposite outermost member 4 and the arm 11 housed therein are then swung over on the pivot 8 to the position 35 in which the arm 4 is shown in phantom and denoted 4' so that the saw frame is then in a fully collapsed condition as illustrated in FIGS. 1 and 3.

When the saw is to be used the saw frame members are extended by simply opening the members in a sequence opposite to the sequence in which the frame is collapsed so that they assume the positions illustrated in solid lines in FIG. 1.

The saw blade is removable from the frame and is transported separately therefrom. The saw blade 16 is provided with a rigid pin 30 adjacent one end which engages the recess 12b on the bifurcated free end of the arm 12 and adjacent the opposite end of the saw blade is provided an opening 32 for receiving a tension applying member 33 which has a hooked tip 33a as illustrated in FIGS. 1 and 5. The tension applying member 33 is an extension of a member 34 which is externally threaded. A spherical bearing member 35 is threaded onto the externally threaded members 34 and is engageable in a recess 36 on the free end of the arm 11. A threaded wing nut 38 is provided for taking up on the bearing member 35 by bearing on a flat 35a thereof to apply tension to the blade 16 to hold it rigidly between the two arms of the frame.

The tension applying mechanism heretofore described is secured to the arm 11 and with a chain 40 and is housed in the channels of the outer back members as illustrated in FIG. 3 when the saw frame is in a collapsed condition. Those skilled in the art will recognize that the member 34 could be permanently attached to the end of the blade and a wing nut, not shown, provided thereon to take up on the blade.

The outermost two back members 4, 6 may be provided, if desired with removable stop pins 12, 13 for holding the arms 11, 12 substantially rigid between the pins and the end surfaces of the outer back members 4, 6 as heretofore described.

The new and novel combination according to the present invention comprises an elongated sheath for receiving and holding at least one saw blade. Preferably, this sheath is constructed as an article of apparel. In the illustration of the invention the sheath comprises, for example, a belt 50 made of two pieces 50a, 50b an elongated opening or pocket 51, for receiving one or a plurality of saw blades therein as illustrated in FIG. 12. The sheath is provided with spaced rivets 53 for receiving and holding the saw blade from axial movement and holding it in position within the belt and precluding contact of the blade teeth as illustrated in FIG. 10. In the embodiment illustrated in FIG. 7 the sheath is provided with a plurality of flaps 55 made integrally with the belt piece 50b and having snaps 56 for snapping the flaps and holding the blade or blades internally of the belt. The belt is worn in the usual manner around the waist of of a person held in belt loops 61 on a pair of trousers 69 in the usual manner in which a belt is worn.

The belt sheath can also be constructed in the manner illustrated in FIG. 9. In this embodiment a belt 65 provided in the usual manner with a buckle 66 and a loop 67. The belt is formed from a pair of pieces 65a, 65b forming an elongated slot or pocket in which one or more blades are housed for transporting thereof when not in use. The belt comprises spaced rivets 68 functioning as before described. The belt is provided with an elongated flap 70 provided with a plurality of snaps 72 and operable to a raised position for sheathing or unsheathing a blade as illustrated in FIG. 11 and then snapped in position as shown in phantom therein.

A third embodiment of the sheath is illustrated in FIGS. 12 and 13. In this embodiment a sheath 75 is made of two pieces 75a and 75b forming an elongated pocket for receiving one ore more blades. The balde is held in the sheath by rivets 76 as before described. In this embodiment however the sheath does not form a complete belt. The ends thereof are closed, for example, by stitching and the sheath is suspended on a belt 78, of the wearer by flaps 79 made integral with the piece 75a and snapped thereon by snaps 80.

The saw frame, when in a collapsed condition, is carried in a case 85 made of a suitable material, for example, leather or plastic. The case 85 is configured in dimensions to receive the saw in a collapsed condition as illustrated in FIG. 8. The case 85 is provided with means comprising a flap 87 secured thereon for releasably suspending and attaching the case 80 to a belt sheath for the blade of the type heretofore described.

It will thus be seen that a new and novel combination of a collapsible saw frame, saw blade sheath and a case for the saw frame ease transportation of the entire saw in a disassmbled condition so the parts thereof can be readily taken from their carrying cases or sheaths and assembled into a working saw.

Moreover, those skilled in the art will recognize that different types of saw blades can be provided, for example one for cross cutting and for use for sawing trees and the like in the field. Other saw blades, for example, meat saw blades, can be provided for use while hunting and living in the field.

While preferred embodiments of the invention have been shown and described it will be understood that many modifications and changes can be made within the true spirit and scope of the invention.

What we claim and desire to secure by Letters Patent is:

1. In combination, a collapsible saw frame, a flexible saw blade, an elongated sheath housing said saw blade extending along a length of said sheath, said sheath having means for wearing it around the waist of a human being with said blade housed therein, a case suspended from said sheath removably housing said saw frame in a collapsed condition, said saw frame comprising rigid members selectively positionable in rigid assembly relatively to each other and for mounting said saw blade thereon for use in sawing.

2. In combination, a collapsible saw frame, a flexible saw blade, an elongated sheath housing said saw blade extending along a length of said sheath, said sheath having means for suspending on a human being with said blade housed therein, a case suspended from said sheath removably housing said saw frame in a collapsed condition, said saw frame comprising rigid members selectively positionable in rigid assembly relatively to each other and for mounting said saw blade thereon for use in sawing.

3. In combination, a collapsible saw frame, a flexible saw blade, a belt comprising an elongated sheath housing said saw blade extending along a length of said belt while said belt is being worn around the waist of a human being with said blade housed therein, a case suspended from said belt removably housing said saw frame in a collapsed condition, said saw frame comprising rigid members selectively positionable in rigid assembly relatively to each other and for mounting said saw blade thereon for use in sawing.

4. In combination, a collapsible saw frame, a flexible saw blade mountable on said frame, said frame comprising rigid members movable to releasably locked positions with the members in rigid extended assembly in condition for use and selectively movable to a collapsed condition, said members having mutually cooperative surfaces for holding the members in said rigid assembly and disposed thereon in positions for rendering them effective automatically when said members are moved into respective positions in an extended condition for use as a rigid assembly, said rigid members including articulated leg members on said frame pivotally for holding said blade in an extended condition for cutting therewith, an elongated sheath wearable as an article of apparel for receiving and removably housing therein said blade, and a case suspended from said sheath receiving and removably housing therein said saw frame in a collapsed condition.

5. In combination, a collapsible saw frame, a flexible saw blade mountable on said frame, said frame comprising a back having more than two pivotally connected, rigid members movable to releasably locked positions with the members in rigid extended assembly for condition for use and selectively movable to a collapsed condition, said members having mutually cooperative surfaces for holding the members in rigid assembly and disposed thereon in positions for rendering them effective automatically when said members are moved into respective positions in an extended condition for use as a rigid assembly, articulated leg members on said frame pivotally mounted on outermost ones of the back rigid members for holding said blade in an extended condition for cutting therewith, an elongated sheath wearable as an article of apparel for receiving and removably housing therein said blade, and a case suspended from said sheath for receiving and removably housing therein said saw frame in a collapsed condition.

6. In combination, a collapsible saw frame, a flexible saw blade mountable on said frame, said frame comprising a back having more than two pivotally connected, rigid members movable to releasably locked positions with the members in rigid extended assembly in condition for use and selectively movable to a collapsed condition, said members having mutually cooperative surfaces for holding the members in said rigid assembly and disposed thereon in positions for rendering them effective automatically when said members are moved into respective positions in an extended condition for use as a rigid assembly, articulated leg members on said frame pivotally mounted on outermost ones of the back rigid members for holding said blade in an extended condition for cutting therewith, a belt comprising a sheath for receiving and removably housing therein said blade, and a case suspended from said belt for receiving and removably housing therein said saw frame in a collapsed condition.

References Cited by the Examiner

UNITED STATES PATENTS

| 1,603,861 | 10/1926 | Mundis. |
| 2,025,886 | 12/1935 | Nordstrom. |
| 2,156,373 | 5/1939 | Craighead. |
| 2,595,288 | 5/1952 | Peters. |
| 2,758,798 | 8/1956 | Schmidt. |
| 2,792,163 | 5/1957 | Kidwell. |
| 2,867,363 | 1/1959 | Kuemmerling. |

FOREIGN PATENTS

| 132,974 | 8/1902 | Germany. |

WILLIAM FELDMAN, *Primary Examiner.*

MILTON S. MEHR, *Examiner.*

R. V. PARKER, JR., *Assistant Examiner.*